US010536507B2

(12) United States Patent
Kataria et al.

(10) Patent No.: US 10,536,507 B2
(45) Date of Patent: Jan. 14, 2020

(54) COGNITIVE EVENT BASED FILE SHARING SYSTEM FOR SOCIAL SOFTWARE

(71) Applicant: INTERNATIONAL BUSINESS MACHINES CORPORATION, Armonk, NY (US)

(72) Inventors: Manish Kataria, Delhi (IN); Amit A. Nanavati, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 21 days.

(21) Appl. No.: 15/829,479

(22) Filed: Dec. 1, 2017

(65) Prior Publication Data

US 2019/0173937 A1  Jun. 6, 2019

(51) Int. Cl.
  G06F 15/16 (2006.01)
  H04L 29/08 (2006.01)
(52) U.S. Cl.
  CPC .............. *H04L 67/06* (2013.01); *H04L 67/04* (2013.01)
(58) Field of Classification Search
  USPC ....... 709/203, 206, 217, 219, 223, 224, 226, 709/228, 230, 232, 238; 707/622, 694; 711/170; 726/30
  See application file for complete search history.

(56) References Cited

U.S. PATENT DOCUMENTS

| 5,893,908 | A | 4/1999 | Cullen et al. |
| 6,757,713 | B1 | 6/2004 | Ogilvie et al. |
| 7,386,574 | B2 | 6/2008 | Abe et al. |
| 8,782,527 | B2 | 7/2014 | Karlson et al. |
| 8,825,611 | B1* | 9/2014 | Jorgensen ........... G06F 21/6218 707/694 |
| 8,924,460 | B2 | 12/2014 | Collet et al. |
| 9,342,990 | B2 | 5/2016 | Karpoff et al. |
| 2002/0129049 | A1* | 9/2002 | Collins ................. G06F 3/0608 709/224 |
| 2002/0129216 | A1* | 9/2002 | Collins ................. G06F 3/0608 711/170 |
| 2003/0172094 | A1 | 9/2003 | Lauria et al. |

(Continued)

OTHER PUBLICATIONS

Mell et al., "The NIST Definition of Cloud Computing", NIST, Sep. 2011, 7 pages, Special Publication 800-145, U.S. Department of Commerce, Gaithersburg, MD.

*Primary Examiner* — Quang N Nguyen
(74) *Attorney, Agent, or Firm* — Erik K. Johnson

(57) ABSTRACT

An embodiment may be a cognitive event based file sharing system. The embodiment may include receiving a file share request by a user, wherein the file share request comprises a file selected for access by intended file recipients. The embodiment may include determining a storage capacity of a computing device of the user. The embodiment may include determining a storage capacity of computing devices of the intended file recipients. The embodiment may include allocating the file based on the storage capacity of the computing device of the user, the storage capacity of the computing devices of the intended file recipients, and a file management policy. The embodiment may include providing access to the file to the intended file recipients. The embodiment may include removing a portion of the file from at least one of the computing devices of the intended file recipients based on the occurrence of a specified event.

17 Claims, 7 Drawing Sheets

(56) References Cited

U.S. PATENT DOCUMENTS

| | | | |
|---|---|---|---|
| 2008/0109911 A1* | 5/2008 | Tedesco | G06F 21/10 |
| | | | 726/30 |
| 2014/0201142 A1* | 7/2014 | Varadharajan | G06F 16/23 |
| | | | 707/622 |
| 2015/0113055 A1* | 4/2015 | Vijayan | G06F 21/60 |
| | | | 709/203 |
| 2015/0186395 A1 | 7/2015 | Yan et al. | |
| 2015/0261776 A1* | 9/2015 | Attarde | G06F 16/1748 |
| | | | 707/664 |
| 2015/0304392 A1 | 10/2015 | Chen et al. | |
| 2017/0193003 A1* | 7/2017 | Vijayan | G06F 16/27 |
| 2017/0206241 A1 | 7/2017 | Beller et al. | |

\* cited by examiner

US 10,536,507 B2

COGNITIVE EVENT BASED FILE SHARING SYSTEM FOR SOCIAL SOFTWARE

BACKGROUND

The present invention relates, generally, to the field of computing, and more particularly to cognitive file sharing.

File sharing is the public or private sharing of computer data or space in a network with various levels of access privilege. In modern computing systems, file sharing is generally used to allow users to share information, such as presentations, team documents, etc.

In the field of enterprise social software, many techniques exist for file sharing. In particular, it is well known that file sharing, for the purposes of file editing, or file viewing, may be facilitated using enterprise social software. Enterprise social software may allow for files to be shared based on the availability of file storage on a target user's computing device. Users maintaining files within an enterprise server may monitor their file storage quota in order to ensure sufficient file storage to send and receive files as needed.

BRIEF SUMMARY

An embodiment of the invention may include a method, computer system, and computer program product for cognitive event based file sharing. The embodiment may include receiving a file share request by a user, wherein the file share request comprises a file selected for access by one or more intended file recipients. The embodiment may include determining a storage capacity of a computing device of the user. The embodiment may include determining a storage capacity of one or more computing devices of the one or more intended file recipients. The embodiment may include allocating the file based on the storage capacity of the computing device of the user, the storage capacity of the one or more computing devices of the one or more intended file recipients, and a file management policy. The embodiment may include providing access to the file to the one or more intended file recipients. The embodiment may include removing a portion of the file from at least one of the one or more computing devices of the one or more intended file recipients based on the occurrence of a specified event.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
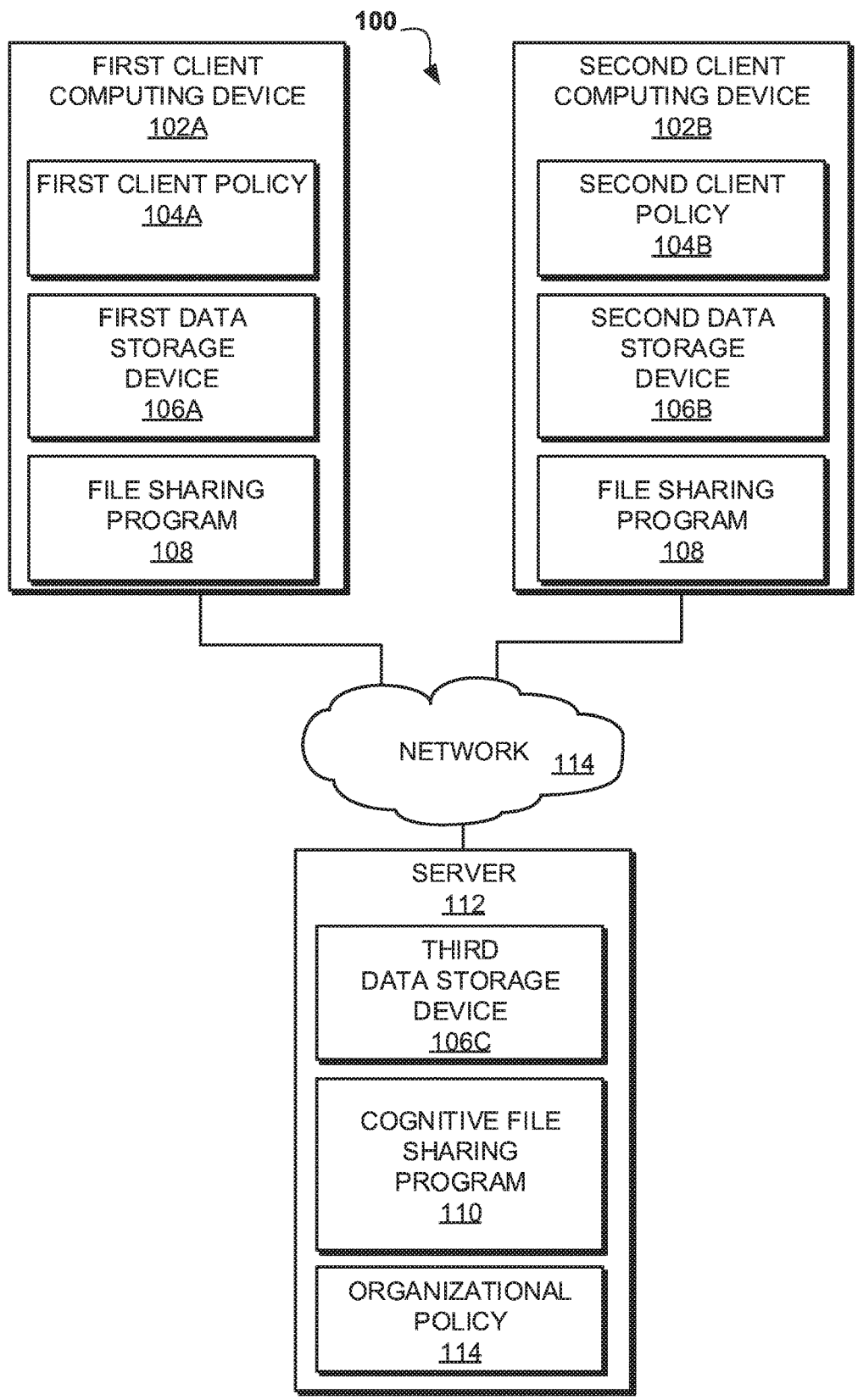
FIG. 1 illustrates a networked computer environment, according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the embodiments set forth herein. In the description, details of well-known features and techniques may be omitted to avoid unnecessarily obscuring the presented embodiments.

Embodiments of the present invention relate to the field of computing, and more particularly to cognitive file sharing. The following embodiments provide a system, method, and program product to, among other things, share files among one or more users based on the occurrence of predetermined events. Therefore, the present embodiment has the capacity to improve the technical field of file sharing by distributing files to intended recipients based on the recipients available file storage. The efficiency of file sharing in an enterprise may also be increased by allowing users to temporarily give file storage space to other users who have exceeded preset file storage quotas. Additionally, files may be deleted from a system based on the occurrence of a predetermined event. Further the system may enable as well as enhance features on a computerized system such as, automatic file storage maintenance, and maximized disk space utilization. Additionally, the present embodiment may result in more efficient and effective file sharing among users.

As previously described, cognitive file sharing may relate to the public or private sharing of computer data or space in a network with various levels of access privilege. In modern computing systems, file sharing is generally used to allow users to share information, such as presentations, team documents, etc. In the field of enterprise social software, many techniques exist for file sharing. In particular, it is well known that file sharing, for the purposes of file editing, or file viewing, may be facilitated using enterprise social software. Enterprise social software may allow for files to be shared based on the availability of file storage on a target user's computing device. Users maintaining files within an enterprise server may monitor their file storage quota in order to ensure sufficient file storage to send and receive files.

However, file storage may be expensive, and file storage quotas may limit the ability to share files among users. For example, users who have exceeded allocated file storage quotas may be unable to send or receive files. This limitation may force users to continuously monitor space utilization, and to continually delete files. As a result, users may delete needed files in favor of newer files, when there is an urgent need to share newer files with a social group such as, for example, a team. Users in an enterprise may use storage in an inconsistent and inefficient manner, because some users may frequently exceeded file storage quotas, and others may underutilize file storage quotas. Therefore, a user may be required to manually monitor file storage usage, and delete files when the user's file storage quota has been exceeded. As such, it may be advantageous to, among other things, share files among users by allocating the size of the files among users with available file storage, and delete the shared file based on the occurrence of a predetermined event.

According to one embodiment, cognitive file sharing may be achieved using a cognitive file sharing program. The cognitive file sharing program may receive a file share request from a user. The cognitive file sharing program may determine the storage capacity of an intended file recipient's computing device. The cognitive file sharing program may determine a file management policy of the individual sharing the file or an intended file recipient's organization, for example, a 60-day file deletion policy, or a file size deletion policy, and apply that policy to the file. Furthermore, the cognitive file sharing program may distribute the file to the intended file recipients by allocating the file size to the intended file recipients based on the availability of file storage among the intended file recipients. The file may be monitored on the intended file recipients computing device for the occurrence of a specified event. Based on a determination that the specified event has occurred, the file can be removed from the intended file recipients computing devices, creating available file storage.

Further, a user whose account is used as shared space, has no ability to view or access the file unless the file has been shared with the user. However, the user whose account is used as shared space may see number of files and size being used by external users on his account. At any time the user may trigger a process to reclaim the shared space, otherwise space is cleared based on policy. Additionally, in some embodiments, the file cannot be in shared space for longer than allowed by policy. However, the file sharing program can control if file should move back to his account space or get deleted following the time lapse. This may lead to better utilization on free disk space on servers and devices within the organization.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described embodiments provide a system, method, and program product to share files among users based on a determined file storage availability, and the occurrence of a predetermined event.

Referring to FIG. 1, a networked computer environment 100 is depicted, according to at least one embodiment. The networked computer environment 100 may include a client computing device 102, and a server 112 interconnected via a communication network 198. According to at least one implementation, the networked computer environment 100 may include a plurality of client computing devices 102, and the server 112.

The communication network 198 may include various types of communication networks, such as a wide area network (WAN), local area network (LAN), a telecommunication network, a wireless network, a public switched network and/or a satellite network. The communication network 198 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102, such as first client computing device 102A and second client computing device 102B, may include a client policy 104, a data storage device 106, and a file sharing program 108, and communicate with the server 112 via the communication network 198, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. Additionally, client computing device 102 may be a virtual machine located on a shared system. As will be discussed with reference to FIG. 6 the client computing device 102 may include internal components 1102 and external components 1104, respectively.

Client policy 104, such as first client policy 104A and second client policy 104B, may be a file located on client computing device 102 that details the preferences and rules which may apply to the related data storage device 106, such as first data storage device 106A and second data storage device 106B, respectively. The client policy 104 may be specific to the user of the computing device 102, and the aspects of client policy 104 may be input by the user. In an example embodiment, a user could register to get a notification when a particular event criteria is met. In another embodiment, a user may define the amount of space in their data storage device 106 that they are willing to share. In an example embodiment, client policy 104 may include rules detailing a duration of time, whether the users with whom the file was shared have viewed/downloaded the file, an occurrence of a real world event, or other relevant events.

The data storage devices 106, such as first data storage device 106A, second data storage device 106B, and third data storage device 106C, may be any physical or virtual computing device capable of storing computer data. The data storage devices 106 may be, for example, optical discs, floppy discs, magnetic memory, flash memory, or any storage device capable of storing computer data. Computer data may be, digital media, such as, for example, computer programs, computer files, or multimedia files. The data storage devices 106 may store data, process computer instructions related to the data, or both. The data storage devices 106 may have a preset storage quota, measured in information units, such as, for example, terabytes, gigabytes, or megabytes. The data storage devices 106 may be unable to store additional computer data when the present storage quota has been reached.

The file sharing program 108 may be a program that facilitates the distribution of digital media, for example, computer programs, computer files, or multimedia files. The file sharing program 108 may store digital media on data storage devices 106, and transmit the digital media to client computing devices 102, using a number of means such as, for example, transmission to centralized servers on computer networks (such as the server computer 112), World Wide Web-based hyperlinked documents, peer-to-peer networking, or any known storage, transmission and dispersion methodology.

The server computer 112 may be a laptop computer, netbook computer, personal computer (PC), a desktop computer, or any programmable electronic device or any network of programmable electronic devices capable of hosting and running a cognitive file sharing program 110 and a data storage device 106 communicating with the client computing device 102 via the communication network 198, in accordance with embodiments of the invention. As will be discussed with reference to FIG. 4, the server computer 112 may include internal components 1102 and external components 1104, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

Organizational policy 114 may be a file located on server 112 that details the preferences and rules which may apply to the related data storage device 106, such as first data storage device 106C, and apply across all data storage devices 106 managed by cognitive file sharing program 110. Based on the contents contained in each, the organizational policy 114 may supersede client policy 104, or vice versa. In an example embodiment, organizational policy may reserve and allot dynamic quotas, over and above user quotas, to users who frequently or liberally share their space with others.

According to the present embodiment, the cognitive file sharing program 110, may be a program capable of receiving and deciding how to share file sharing requests, in order to facilitate the transmission of one or files to a number of intended recipients. The cognitive file sharing program 110 may determine available file storage quota among intended recipients, as well as a related file management policy for the intended recipients computing devices. The cognitive file sharing program 110 may allocate the size of the file among the intended recipients based on the determined file storage availability. The cognitive file sharing program 110 may transmit the file to the intended recipients in line with a predetermined event such as, for example, all intended recipients have viewed the file. Once the predetermined event has occurred, the cognitive file sharing program 110 may delete the file. The cognitive file sharing method is explained in further detail below with respect to FIG. 2.

In at least one embodiment, the cognitive file sharing program 110, may provide a file storage usage analysis to a file system administrator. The file storage usage analysis may include information, such as, for example, overutilized or underutilized file storage, frequent file storage lenders, and frequent file storage borrowers. The file system administrator may use the file storage usage analysis to reallocate file storage among users, in order to maximize the utility of the file storage resources.

Figure 2:
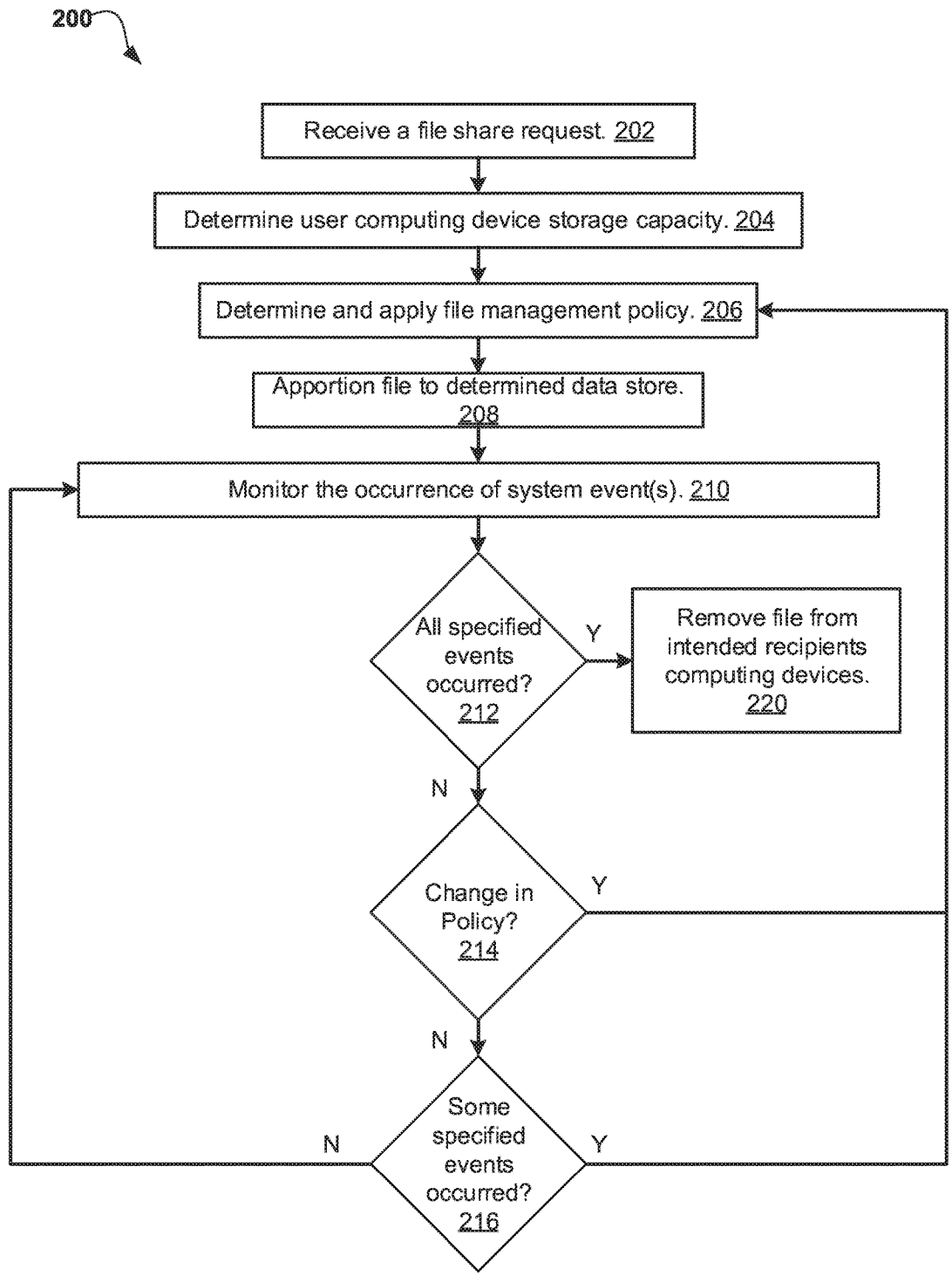
FIG. 2 is an operational flowchart illustrating a cognitive file sharing system, according to at least one embodiment.

FIG. 2 is an operational flowchart illustrating a cognitive file sharing process 200, according to at least one embodiment. At 202, the cognitive file sharing program 110 receives a file share request. A user may select a file for sharing with a number of recipients.

Referring to step 204, the cognitive file sharing program 110 may determine the storage capacity of the connected computing devices, such as first computing device 102A, second computing device 102B, and server 112. The cognitive file sharing program 110 may access the data storage device 106 on client computing device 102, to determine the amount of file storage quota available.

In at least one embodiment, the cognitive file sharing program 110 may display the available file storage of intended file recipients to a file sharing program 108. The file sharing program 108 may decide to share a file with additional users or reduce the size of the file, if none of the intended file recipients have enough free file storage collectively, to receive the file share.

The cognitive file sharing program 110 may determine that the file sharing program 108 as well as the intended recipients can share the file. The cognitive file sharing program 110 may perform a file storage quota analysis to determine the size of the file to be shared, and the available file storage of the intended recipients and file sharing program 108. The cognitive file sharing program 110 may determine that the file sharing program 108 and the intended recipients have a remaining file storage that is collectively greater than or equal to the size of the file to be shared.

In at least one embodiment, the cognitive file sharing program 110 may store a history of file storage quota usage for a number of users in an enterprise. The cognitive file sharing program 110 may suggest a number of users to request file storage from to a file sharing program 108, when the file sharing program 108 desires to share a file with a number intended file recipients who do not have sufficient file storage to receive the file share.

Referring to step 206, the cognitive file sharing program 110 may determine and apply a file management policy to the file to be shared. The cognitive file sharing program 110 may apply the rules set forth in client policy 106 and organizational policy 114 by combining the rules, where applicable, and by selecting the superseding policy rule in instances where a rule conflicts. Additionally, cognitive file sharing program 110 may include client policy 106 for a specific client computing device 102, such as second client policy 104B from second client computing device 102B, to account for specific rules for storing data on that device. For example, the file sharing program 108 may request that the uploaded file be deleted after all intended recipients have viewed the file. The cognitive file sharing program 110 may apply the file management policy to the file, and provide the sharing user with the file management policy via a pop-up window or prompt.

Additionally, cognitive file sharing program 110 may determine a file allocation policy. The file allocation may be based on a set of rules contained in client policy 104 and organizational policy 114. Additionally, cognitive file sharing program 110 may allocate space based on the file space of the user sharing the file, the file space of the users receiving the file, the file space of the departments of the users, and the file space of any users that are not affiliated with the file being shared. Cognitive file sharing program 110 may account for. Cognitive file sharing 110 may use machine learning techniques to partition data to each data storage device 110, such that the data will be readily available when a user wants to access the data, and to limit the transfer of data between different data storage devices 106. This may be accomplished by accounting for current usage patterns, historical usage patterns, and current quotas of each data storage device 106, usage patterns of each user that is given access to the file, and any other relevant parameters.

Referring to step 208, the cognitive file sharing program 110 may apportion the file to the computing devices based on the storage allocation determined in step 206. The cognitive file sharing program 110 may transmit the file from the data storage device 106 on the server 112, to one or more client computing devices 102, over the network 198. File sharing program 108 may receive the incoming file share from the cognitive file sharing program 110, and attempt to store the incoming file in the data storage device 106 of the client computing devices 102.

In at least one embodiment, the cognitive file sharing program 110 may automatically use the available file storage quota of one or more intended recipients to facilitate a file share.

Referring to step 210, the cognitive file sharing program 110 may monitor the intended file recipients to determine the occurrence of a specified event determined in step 206, or a change in policy of a user involved in the file sharing. System allows for complex set of logical rules (AND, OR, NOT) and also supports the definition of subgroups in the broader group with whom file is shared and then individual deletion policies can be applied on each one of them. For example: Delete this file when "Everyone from subgroup1 (may be from same department) has downloaded the file, and any one person from subgroup2 has downloaded it". System would still retain the meta-data around the file, including trigger for deletion, so the owner in future can look back on any collaboration which happened around the deleted artifact. Other examples include time lapse window, certain percentage of users have downloaded the file, after a file has been re-shared or recommended a certain number of time, or has been viewed by all or percentage of users in a group, department or organization.

Referring to step 212, the cognitive file sharing program 110 determines if all specified events have occurred. The specified events may be events determined in step 206. If all of the specified events have been met, cognitive file sharing program proceed to step 220. If all of the specified events have not been met, cognitive file sharing program 110 proceeds to step 214.

Referring to step 220, the cognitive file sharing program 110 may remove the shared file from the intended recipients computing devices. The shared file may be purged from the server 112 as well as the client computing devices 102 based on the occurrence of the specified event at step 210. The file storage quota that was loaned to another user to facilitate the file share may be automatically returned to the loaning user.

Referring to step 214, cognitive file sharing program 214 determines if there is a substantial change in policy that would require a change in file storage. For example, if a user changes the amount of space allocated on their device to sharing, or decides to no longer share space, this may result in a change in file storage if the amount of space is less than the size of files on the device. If there has not been a substantial change in policy, cognitive file sharing program proceeds to step 216. If there has been a substantial change in policy, cognitive file sharing program 110 proceeds to step 2.

Referring to step 216, the cognitive file sharing program 110 determines if any specified events have occurred. The specified events may be events determined in step 206. If any of the specified events have been met, cognitive file sharing program proceed to step 206 to re-evaluate the file allocation. If no specified events have been met, cognitive file sharing program 110 proceeds to step 210 to continue monitoring.

It may be appreciated that FIG. 2 provides only an illustration of one implementation and does not imply any limitations with regard to how different embodiments may be implemented. Many modifications to the depicted environments may be made based on design and implementation requirements. More specifically, in at least one embodiment the cognitive file sharing program 110 may provide suggested file management policies to file sharing program 108s, based on an analysis of past file management policies used during previous file shares.

Figure 3A:
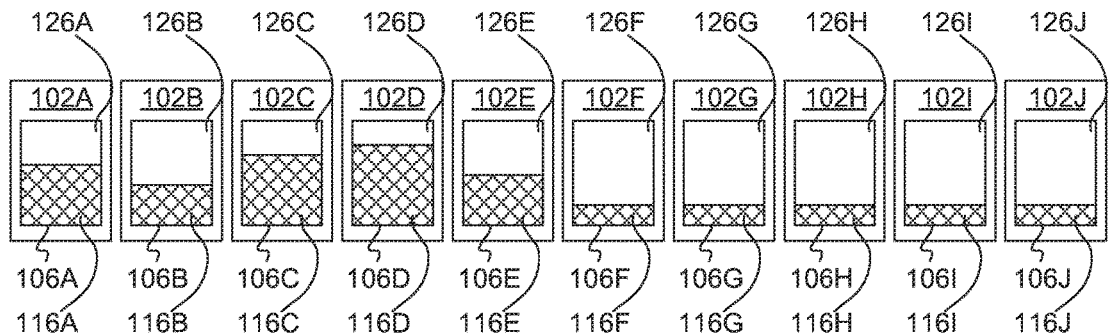
FIGS. 3A-3D are example storage allocations for multiple data storage devices of the cognitive file sharing system, according to at least one embodiment.

In an example scenario, illustrated in FIG. 3A, User A decides to share a file amongst 5 other members of his team, User B, User C, User D, User E, User F. Further, User A has 4 other people in his organization that are part of the cognitive file sharing system, Users G, H, I, and J (e.g. third parties). Each User has a corresponding client device 102 (e.g. User E corresponds to client device 102E), and each client device 102 has a corresponding data storage device 106 (e.g. client device 102E corresponds to data storage device 106E). Each data storage device 106 can contain user allocated data 116, corresponding to space used by the user (e.g. User E stored user allocated data 116E). Additionally, each data storage device 106 can contain user available data 126, corresponding to space used that the user can user for their own use (e.g. User E can store data in user available data 126E). In this scenario, the file that User A shares is 40 GB. User A only has 15 GB of storage (depicted as user available data 126A) space allocated in the shared space. However, User B has 10 GB (126B), User C has 8 GB (126C), User D has 5 GB (126D), User E has 12 GB (126E), and Users G, H, I, and J each have 20 GB (126G, H, I, and J, respectively).

Figure 3B:
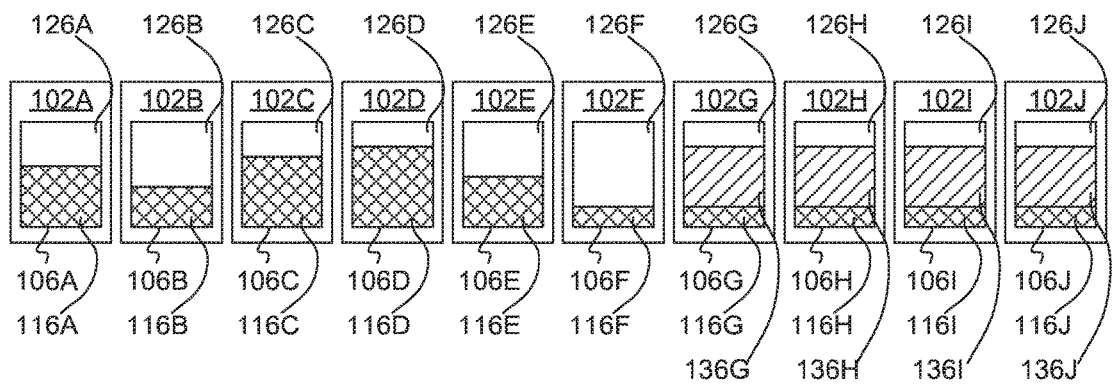

In one embodiment, in step 206, a file management policy may be created in where each user has fully shared their entire allotment, and the file management policy favors the maintenance of data in a static data storage devices 106 until the data is deleted. In such a scenario, at step 208, cognitive file sharing program 110 may determine that User G and H never have less than 15 GB of unused storage, and Users I and J never has less than 12 GB of unused storage, while Users A-F frequently use their entire storage quote. In such a scenario in step 208, as depicted in FIG. 3B, cognitive file sharing program 110 may evenly distribute the file amongst Users G-J, using shared storage 136G, shared storage 136H, shared storage 136I, and shared storage 136J, until each of Users B-F view the file (step 212), and the file is deleted in step 220. Until the deletion of file, Users G-J would not be able to access files in shared storage 136G-J, even though the files use the data storage devices 106G-J, as the users were not given permission to access those files.

Figure 3C:
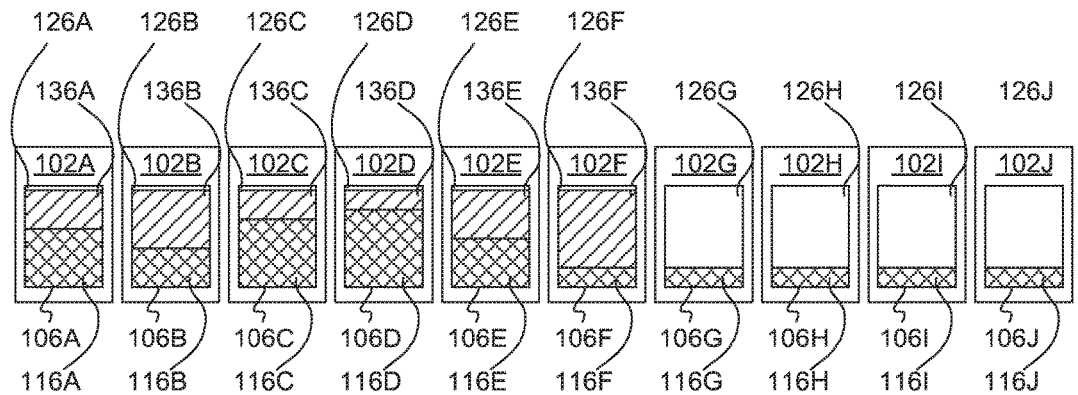
Figure 3D:
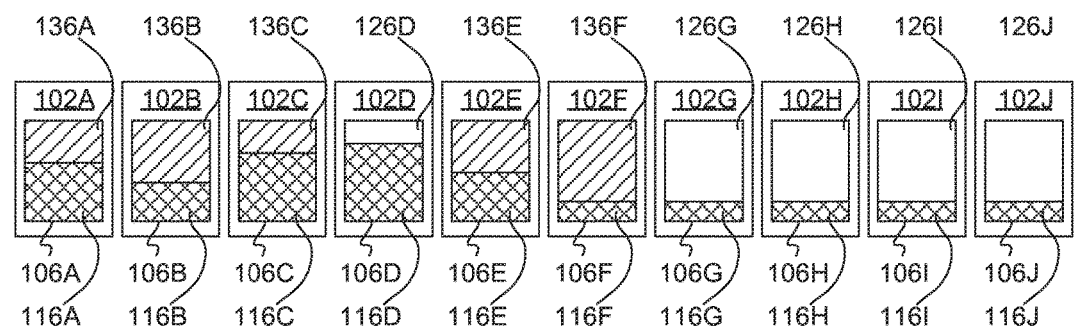

In another embodiment, in step 206, a file management policy may be created in where each user has fully shared their entire allotment, and the file management policy favors the maintenance of data in a data storage devices 106 controlled by those who have access to the data. Additionally, the file management policy may, if possible, remove the data from a user's data storage device 106 when the file has been viewed by that user. In this embodiment depicted in FIG. 3C, at step 208, cognitive file sharing program 110 may distribute the file amongst Users A-F, in user shared data 136A-F, such that each user still has 1 GB of storage remaining (depicted as user available data 126A-F). In this scenario, if User D downloads the file, at step 216, cognitive file sharing program 110 may determine it needs to reevaluate the file sharing allocation, and return to step 206. After the reevaluation at step 208, as depicted in FIG. 3D, the file may be stored amongst Users A, B, C, E, F in user shared data 136 A, B, C, E, F, as depicted in FIG. 3D.

Figure 4:
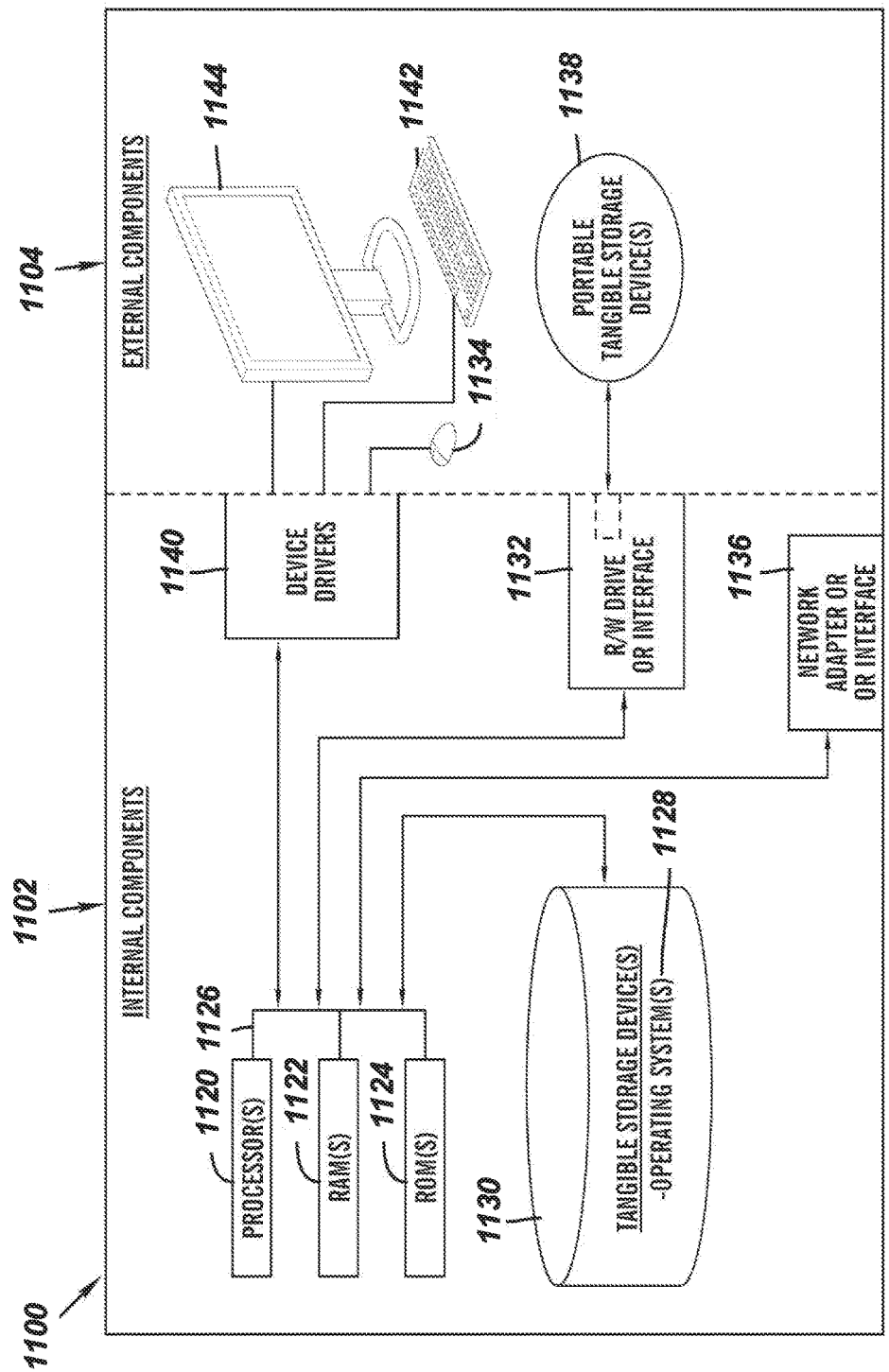
FIG. 4 is a block diagram of internal and external components of servers depicted in FIG. 1, according to at least one embodiment.

FIG. 4 is a block diagram 1100 of internal and external components of the client computing device 102 and the server 112 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 1102, 1104 is representative of any electronic device capable of executing machine-readable program instructions. The data processing system 1102, 1104 may be representative of a smart phone, a computer system, PDA, or other electronic devices. Examples of computing systems, environments, and/or configurations that may represented by the data processing system 1102, 1104 include, but are not limited to, personal computer systems, server computer systems, thin clients, thick clients, hand-held or laptop devices, multiprocessor systems, microprocessor-based systems, network PCs, mini-computer systems, and distributed cloud computing environments that include any of the above systems or devices.

The client computing device 102 and the server 112 may include respective sets of internal components 1102 and external components 1104 illustrated in FIG. 4. Each of the sets of internal components 1102 include one or more processors 1120, one or more computer-readable RAMs 1122, and one or more computer-readable ROMs 1124 on one or more buses 1126, and one or more operating systems 1128 and one or more computer-readable tangible storage devices 1130. The one or more operating systems 1128, the software program 108 in the client computing device 102 and the cognitive file sharing program 110 in the server 112 are stored on one or more of the respective computer-readable tangible storage devices 1130 for execution by one or more of the respective processors 1120 via one or more of the respective RAMs 1122 (which typically include cache memory). In the embodiment illustrated in FIG. 4, each of the computer-readable tangible storage devices 1130 is a magnetic disk storage device of an internal hard drive. Alternatively, each of the computer-readable tangible storage devices 1130 is a semiconductor storage device such as ROM 1124, EPROM, flash memory or any other computer-readable tangible storage device that can store a computer program and digital information.

Each set of internal components 1102 also includes a R/W drive or interface 1132 to read from and write to one or more portable computer-readable tangible storage devices 1138 such as a CD-ROM, DVD, memory stick, magnetic tape, magnetic disk, optical disk or semiconductor storage device. A software program, such as the cognitive file sharing program 110, can be stored on one or more of the respective portable computer-readable tangible storage devices 1138, read via the respective R/W drive or interface 1132, and loaded into the respective hard drive 1130.

Each set of internal components 1102 also includes network adapters or interfaces 1136 such as a TCP/IP adapter cards, wireless Wi-Fi interface cards, or 3G or 4G wireless interface cards or other wired or wireless communication links. The file sharing program 108 in the client computing device 102 and the cognitive file sharing program 110 in the server 112 can be downloaded to the client computing device 102 and the server 112 from an external computer via a network (for example, the Internet, a local area network or other, wide area network) and respective network adapters or interfaces 1136. From the network adapters or interfaces 1136, the file sharing program 108 in the client computing device 102 and the cognitive file sharing program 110 in the server 112 are loaded into the respective hard drive 1130. The network may comprise copper wires, optical fibers, wireless transmission, routers, firewalls, switches, gateway computers and/or edge servers.

Each of the sets of external components 1104 can include a computer display monitor 1144, a keyboard 1142, and a computer mouse 1134. External components 1104 can also include touch screens, virtual keyboards, touch pads, pointing devices, and other human interface devices. Each of the sets of internal components 1102 also includes device drivers 1140 to interface to computer display monitor 1144, keyboard 1142, and computer mouse 1134. The device drivers 1140, R/W drive or interface 1132, and network adapter or interface 1136 comprise hardware and software (stored in storage device 1130 and/or ROM 1124).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
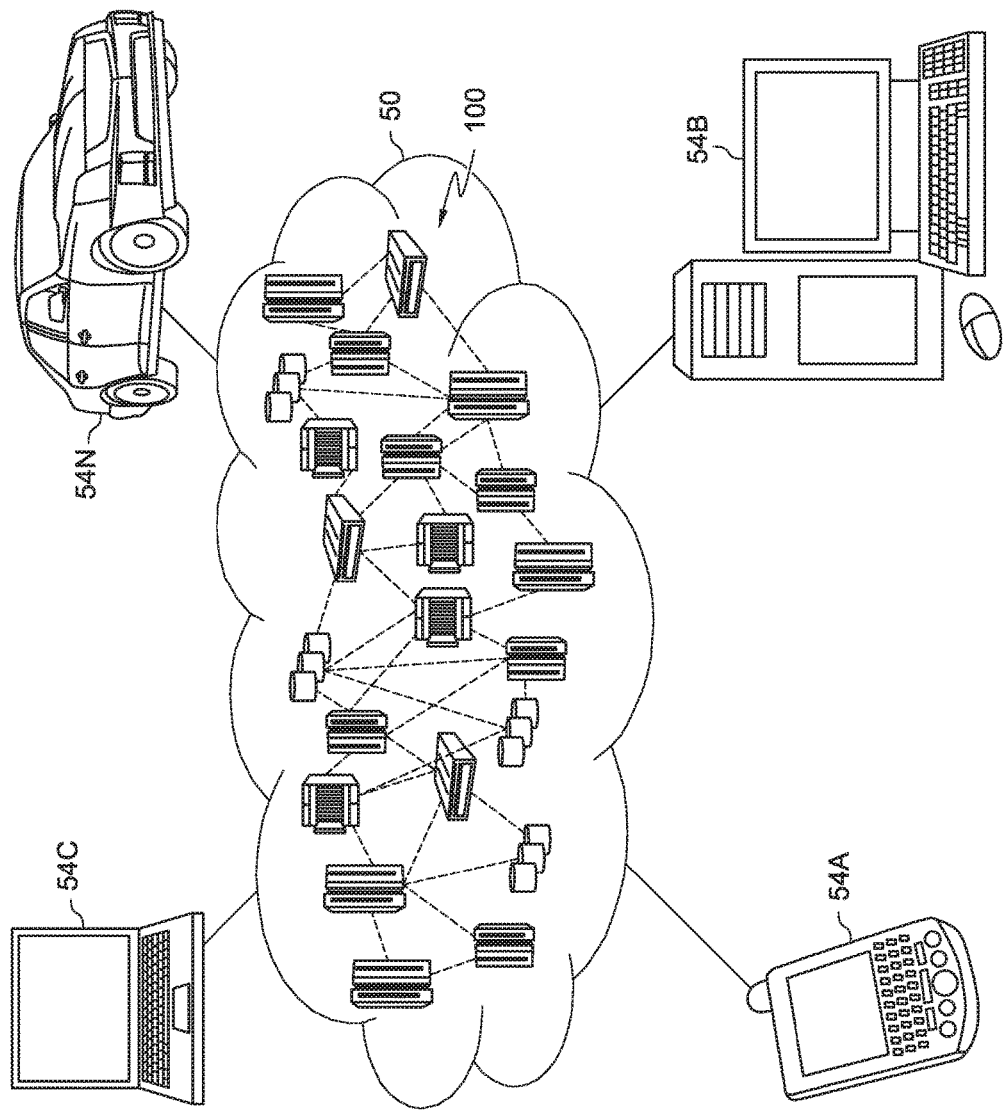
FIG. 5 depicts a cloud computing environment, according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
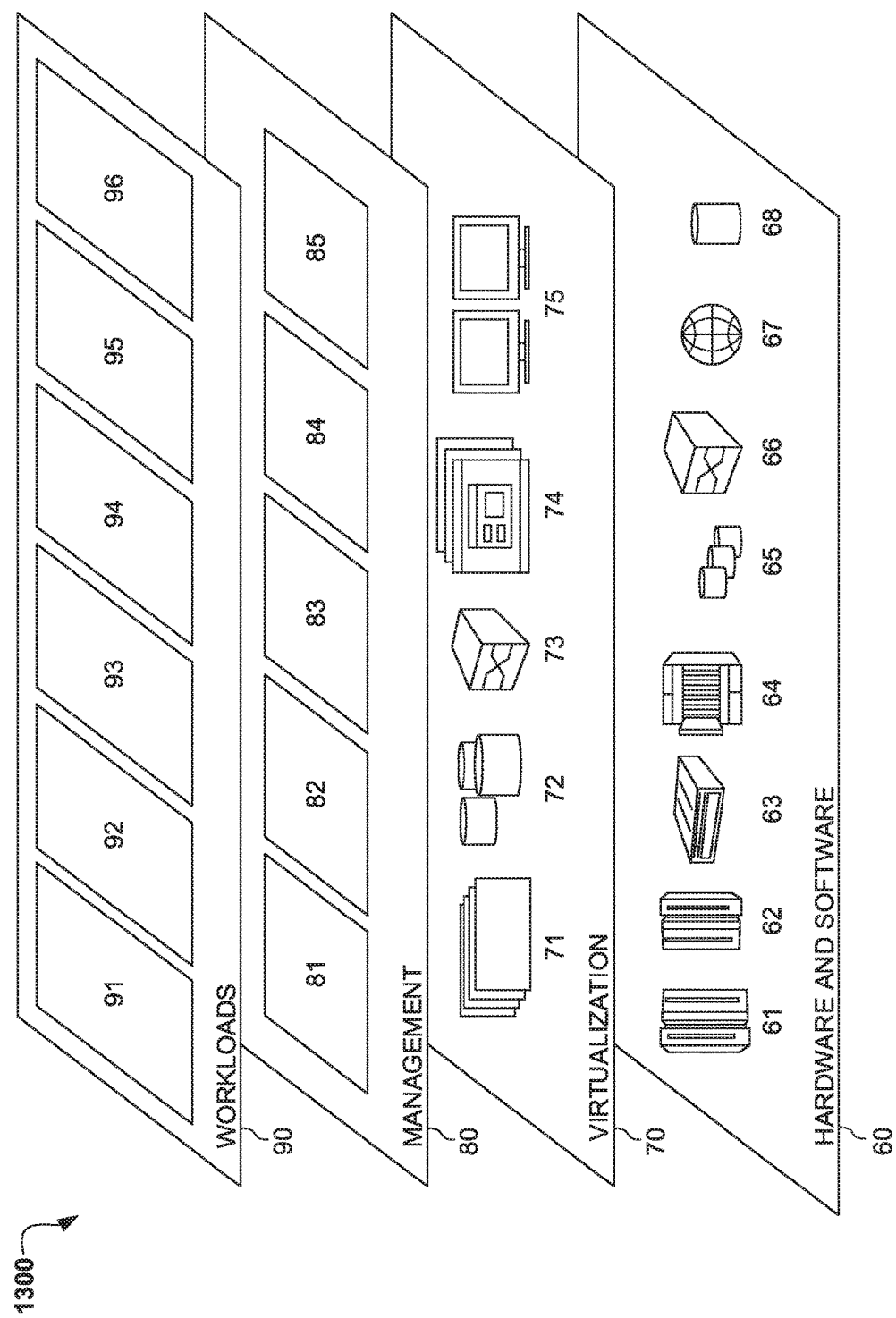
FIG. 6 depicts abstraction model layers, according to an embodiment of the present invention.

Referring now to FIG. 6, a set of functional abstraction layers 1300 provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cognitive event based file sharing 96. Cognitive event based file sharing may relate to receiving a file share request, determining available file storage among intended file recipients, sharing the file based on a file sharing policy, and a reallocation of available file storage, and removing the file based on the occurrence of a predetermined event.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for cognitive event based file sharing, the method comprising:
    receiving a file share request by a user, wherein the file share request comprises a file selected for access by one or more intended file recipients;
    determining a storage capacity of a computing device of the user; determining a storage capacity of one or more computing devices of the one or more intended file recipients;
    allocating the file based on the storage capacity of the computing device of the user, the storage capacity of the one or more computing devices of the one or more intended file recipients, and a file management policy;
    providing access to the file to the one or more intended file recipients; and
    removing a portion of the file from at least one of the one or more computing devices of the one or more intended file recipients based on the occurrence of a specified event;
    wherein removing a portion of the file from at least one of the one or more computing devices of the one or more intended file recipients based on the occurrence of a specified event comprises reallocating a portion of the file on a first computing device of a first intended file recipient of the plurality of file recipients to the computing devices of the other file recipients based on the first file recipient accessing the file.

2. The method of claim 1, wherein allocating further comprises allocating the file based on the storage capacity of one or more computing devices of one or more third party users, wherein each third party user does not have access to the file.

3. The method of claim 2, wherein allocating the file comprises allocating the file entirely on the one or more computing devices of the one or more third party users.

4. The method of claim 1 further comprising reallocating the file based on a change in the storage capacity of the computing device of the user, the storage capacity of the one or more computing devices of the one or more intended file recipients.

5. The method of claim 1, wherein allocating the file further comprises allocating the file based on a history of usage of the storage capacity of the computing device of the user and a history of usage of the storage capacity of the one or more computing devices of the one or more intended file recipients.

6. The method of claim 1, wherein removing a portion of the file from at least one of the one or more computing devices of the one or more intended file recipients based on the occurrence of a specified event comprises removing the entire file based on all of the intended file recipients accessing the file.

7. A computer system for cognitive event based file sharing, the computer system comprising: one or more processors, one or more computer-readable storage devices and program instructions stored on at least one of the one or more computer-readable storage devices for execution by at least one of the one or more processors to perform a method comprising:
receiving a file share request by a user, wherein the file share request comprises a file selected for access by one or more intended file recipients;
determining a storage capacity of a computing device of the user;
determining a storage capacity of one or more computing devices of the one or more intended file recipients;
allocating the file based on the storage capacity of the computing device of the user, the storage capacity of the one or more computing devices of the one or more intended file recipients, and a file management policy;
providing access to the file to the one or more intended file recipients; and
removing a portion of the file from at least one of the one or more computing devices of the one or more intended file recipients based on the occurrence of a specified event;
when removing a portion of the file from at least one of the one or more computing devices of the one or more intended file recipients based on the occurrence of a specified event comprises reallocating a portion of the file on a first computing device of a first intended file recipient of the plurality of file recipients to the computing devices of the other file recipients based on the first file recipient accessing the file.

8. The computer system of claim 7, wherein allocating further comprises allocating the file based on the storage capacity of one or more computing devices of one or more third party users, wherein each third party user does not have access to the file.

9. The computer system of claim 8, wherein allocating the file comprises allocating the file entirely on the one or more computing devices of the one or more third party users.

10. The computer system of claim 7 further comprising reallocating the file based on a change in the storage capacity of the computing device of the user, the storage capacity of the one or more computing devices of the one or more intended file recipients.

11. The computer system of claim 7, wherein allocating the file further comprises allocating the file based on a history of usage of the storage capacity of the computing device of the user and a history of usage of the storage capacity of the one or more computing devices of the one or more intended file recipients.

12. The computer system of claim 7, wherein removing a portion of the file from at least one of the one or more computing devices of the one or more intended file recipients based on the occurrence of a specified event comprises removing the entire file based on all of the intended file recipients accessing the file.

13. A computer program product for cognitive event based file sharing, the computer program product comprising: one or more computer-readable storage devices, and program instructions stored on the one or more storage devices for execution by at least one or more processors to perform a method comprising:
receiving a file share request by a user, wherein the file share request comprises a file selected for access by one or more intended file recipients;
determining a storage capacity of a computing device of the user;
determining a storage capacity of one or more computing devices of the one or more intended file recipients;
allocating the file based on the storage capacity of the computing device of the user, the storage capacity of the one or more computing devices of the one or more intended file recipients, and a file management policy;
providing access to the file to the one or more intended file recipients; and
removing a portion of the file from at least one of the one or more computing devices of the one or more intended file recipients based on the occurrence of a specified event;
wherein removing a portion of the file from at least one of the one or more computing devices of the one or more intended file recipients based on the occurrence of a specified event comprises reallocating a portion of the file on a first computing device of a first intended file recipient of the plurality of file recipients to the computing devices of the other file recipients based on the first file recipient accessing the file.

14. The computer program product of claim 13, wherein allocating further comprises allocating the file based on the storage capacity of one or more computing devices of one or more third party users, wherein each third party user does not have access to the file.

15. The computer program product of claim 13 further comprising reallocating the file based on a change in the storage capacity of the computing device of the user, the storage capacity of the one or more computing devices of the one or more intended file recipients.

16. The computer program product of claim 13, wherein allocating the file further comprises allocating the file based on a history of usage of the storage capacity of the computing device of the user and a history of usage of the storage capacity of the one or more computing devices of the one or more intended file recipients.

17. The computer program product of claim 13, wherein removing a portion of the file from at least one of the one or more computing devices of the one or more intended file recipients based on the occurrence of a specified event comprises removing the entire file based on all of the intended file recipients accessing the file.

\* \* \* \* \*